United States Patent [19]

Suhan

[11] Patent Number: 5,181,081
[45] Date of Patent: Jan. 19, 1993

[54] PRINT SCANNER

[75] Inventor: John M. Suhan, Blakely, Pa.

[73] Assignee: WEA Manufacturing, Inc., Olyphant, Pa.

[21] Appl. No.: 579,080

[22] Filed: Sep. 6, 1990

[51] Int. Cl.⁵ .............................................. G01B 11/00
[52] U.S. Cl. ................................... 356/394; 356/237; 356/448
[58] Field of Search ............... 356/394, 398, 388, 392, 356/237, 446, 448, 240; 382/8, 9, 34, 51; 250/223 B

[56] References Cited

U.S. PATENT DOCUMENTS

| | | | |
|---|---|---|---|
| 4,202,631 | 5/1980 | Uchiyama et al. | 356/394 |
| 4,270,863 | 6/1981 | Trogdon | 356/448 |
| 4,579,455 | 4/1986 | Levy et al. | 356/394 |
| 4,691,231 | 9/1987 | Fitzmorris et al. | 356/240 |

Primary Examiner—Richard A. Rosenberger
Assistant Examiner—Hoa Pham
Attorney, Agent, or Firm—Shenier & O'Connor

[57] ABSTRACT

A print scanner for detecting defects in the label of a compact disc or the like supported on a carrier moved through a label printing station into a substantially light-tight housing in which the disc is illuminated with diffuse light through a mask so that a video camera in the housing sees only the label area. A reference image derived from a multiplicity of video frames and a sample image derived from a plurality of video frames are subtracted each from the other, two histograms are computed from the subtraction results and respective figures of merit for missing ink and added ink are calculated from the histograms.

18 Claims, 6 Drawing Sheets

5,181,081

PRINT SCANNER

FIELD OF THE INVENTION

The invention relates to a print scanner and, more specifically, to a print scanner for determining defects in the printing of a compact disc label.

BACKGROUND OF THE INVENTION

Various arrangements are known in the prior art for scanning printing such as that contained on a label. Some of these devices take their reference and sample signals from a video camera. The images are stored in a computer's random access memory wherein comparisons are made between the reference and sample images by "template matching" tailored to the nature of the inspection being performed. While most of these systems are satisfactory for the purposes for which they are designed, in general they are not suitable for the inspection of compact disc labels, owing to the nature of the labels and their reflective diffraction grating substrates. In most instances, moreover, they are not as sensitive as is desired. Most of them inspect for missing ink but fail to make any provision for inspection with reference to added or superfluous ink.

SUMMARY OF THE INVENTION

One object of my invention is to provide a print scanner which overcomes defects of print scanners of the prior art.

Another object of my invention is to provide a print scanner which is especially adapted for the inspection of compact disc labels.

Still another object of my invention is to provide a print scanner which detects both added and missing ink.

Yet another object of my invention is to provide a print scanner which is more sensitive than are print scanners of the prior art.

Other and further objects of my invention will appear from the following description.

BRIEF DESCRIPTION OF THE DRAWINGS

In the accompanying drawings to which reference is made in the instant specification and which are to be read in conjunction therewith and in which like reference numerals indicate like parts in the various views.

DESCRIPTION OF THE PREFERRED EMBODIMENT

Figure 1:
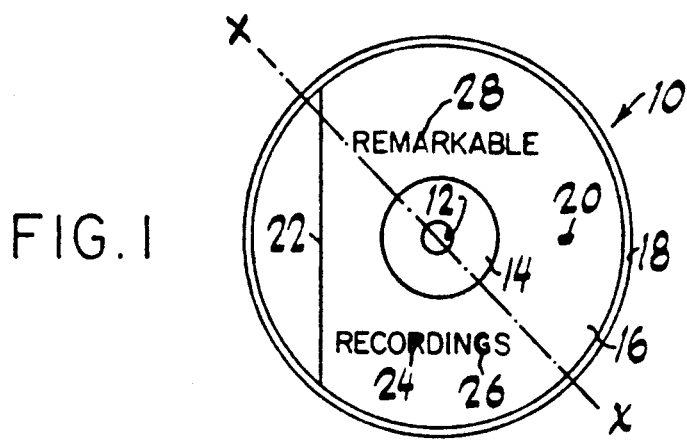
FIG. 1 is a plan view of a compact disc illustrating printing defects which can occur in the label thereof.

Referring now to FIG. 1 of the drawings, as is known in the art a compact disc, indicated generally by the reference character 10, has a central hole 12, a central area 14 within the ID ring carrying no printing, a major area 16 thereof to which printing may be applied, and a narrow peripheral area 18 carrying no printing. In the example I have chosen in FIG. 1, the disc is to carry the legend "Remarkable Recordings" in bold letters. Further by way of example, I have illustrated certain defects which may occur in the course of the printing process. These include a number of excess ink defects such as a spot 20 in which no ink should be present, a line 22 extending along a chord of the disc, a filling in 24 of a letter or a printing 26 of a letter with excess ink. A missing ink defect is illustrated by the area 28 of the word "REMARKABLE". As will be explained hereinbelow, my print scanner can detect all of these defects. It can detect a defect diameter as small as 15 thousandths of an inch.

Figure 2:
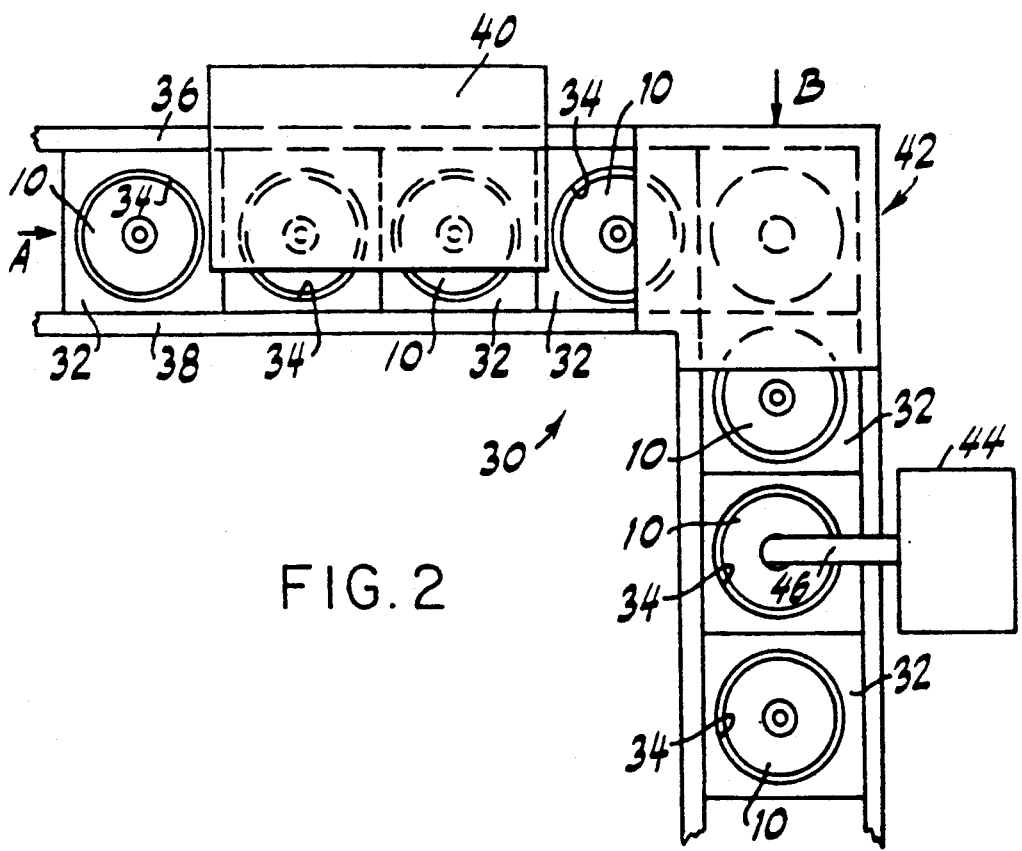
FIG. 2 is a partially schematic view of a compact disc label printing system with which my print scanner may be used.

One form of disc printing apparatus indicated generally by the reference character 30 to which my print scanner can be applied includes a plurality of disc carriers 32, each of which has a recess 34 for receiving a disc 10. The disc conveyor comprises a pair of spaced rails 36 and 38 having a right angle bend at one point along their lengths so that the direction of movement of the carriers is changed by 90 degrees. More specifically, the conveyor comprises a first push rod (not shown) or the like for advancing the carriers in steps in the direction of the arrow A in FIG. 2. A second pusher (not shown) or the like moves the carriers in the direction of the arrow B. Since the conveyor per se forms no part of my invention, it will not be described in further detail.

The carriers 32 move the discs 10 through a printing station 40 whereat the label information is applied to the discs in a manner known to the art. It will readily be appreciated that the station 40 may span a number of carriers 32.

After leaving the printing station 40 and having received all of the printing for the label, a disc is moved into a camera station indicated generally by the reference character 42 whereat my print scanner is located. The carrier 32 stops at this station for a sufficient period of time to permit the inspection operation to take place.

After leaving the camera station 42, the carriers move past a robot station at which a robot 44 having an arm 46 is located. As will be explained more fully hereinbelow, my system is so arranged as to send a defect signal to the robot 44 concomitantly with the arrival at the robot station of the disc 10 having the defective label. In response to the defect signal, the robot removes the disc and places it among the defects. Again, since the robot 44 itself forms no part of my invention, it will not be described in further detail.

Figure 3:
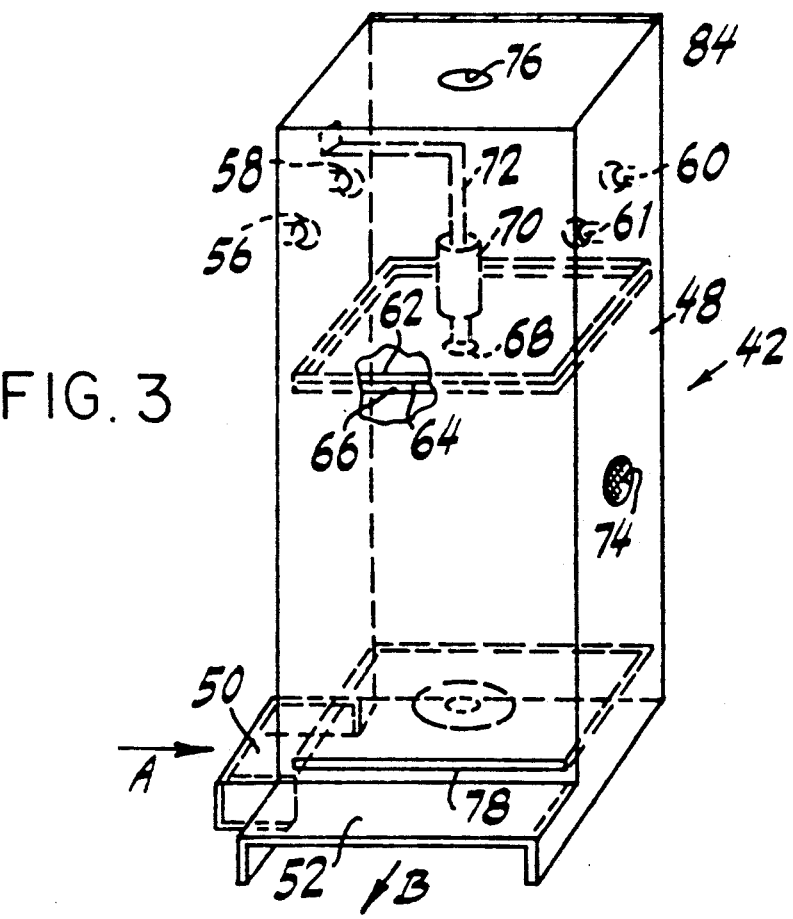
FIG. 3 is a perspective view of the camera station of my print scanner.
Figure 4:
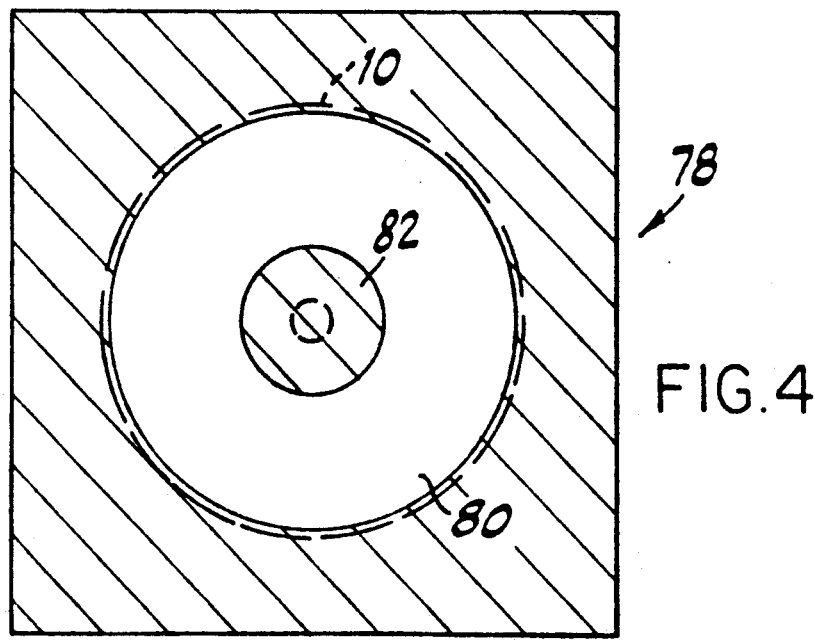
FIG. 4 is a plan view illustrating the mask incorporated in my print scanner.

Referring now to FIG. 3, the camera station 42 at which my scanner is located includes a light-tight housing 48 formed with a tunnel 50 through which the carriers 32 enter in the direction of the arrow A and an exit tunnel 52 from which the carriers 32 emerge in the direction of the arrow B. The location of the camera station has been chosen at a point at which the entire label has been applied to the compact disc and at which the motion path of the robot 44 will not be impeded. Owing to the fact that the conveyor makes a right-hand turn at this point, the exit tunnel 52 is at 90 degrees to the entrance tunnel 50. The clearance heights for the tunnels 50 and 52 are based on the heights of the disc carriers 32. Owing to the fact that a compact disc is quite reflective, my scanner is inspecting labels which have been applied to highly reflective diffraction gratings. As a result, any unwanted motion interference surrounding a disc under inspection will be reflected into the view of the camera acting as a "false" print defect. To obviate this problem, I so construct the camera mount that the area which is local to the disc under inspection is surrounded by the body of the camera station allowing the background reflections from the disc to be held constant. The tunnels or ports 50 and 52 further prevent moving background reflections. The insides of the tunnel are painted flat black so as to absorb any external light.

The inner walls of the housing 48 can be reflected off the surface of the disc 10, appearing as "shadow" regions, reducing the ability to detect defects in the area they eclipse owing to a loss in contrast between the ink and the background illumination reflected off the disc. I so construct the camera station that the walls of the housing 48 are sufficiently far from the center of each disc as to eliminate the eclipse effect. In addition, the inner walls are painted gloss white to minimize light loss due to absorption.

When a diffraction grating such as a compact disc is illuminated with a white light source whose size is smaller than that of the grating, diffraction glare results. In my scanner I reduce this effect to a negligible one by employing a diffuse light source to illuminate the disc. More specifically, I employ four symmetrically mounted incandescent bulbs 56, 58, 60 and 61 on the inner surface of the housing 48. A light diffuser positioned within the housing below the sources includes an upper clear plexiglass layer 62, an intermediate layer of diffusing paper 64 and a lower layer 66 of yellow plexiglass. Preferably, I mount the assembly of the layers 62, 64 and 66 in slots in the inside of the walls of the housing 48 to prevent shadow reflections from reaching the camera to be described. A hole 68 through the diffuser assembly permits the camera to view the disc.

I choose a CCD (charge-coupled device) camera 70 as the optical detector for my system owing to its capability to operate indefinitely, its high optical resolution and its small volume of about 18 cubic inches. I mount the camera within the housing 48 by means of a steel bracket which is locked in place within a specially designed slot in one of the housing walls. The bracket arm is so located as to prevent a shadow from being cast on the disc.

Bracket 72 also holds the camera so that its horizontal scan lines make a 45 degree angle with the text line contained on the label of the disc being scanned, as indicated by the line X—X in FIG. 1. This configuration eliminates "video flicker" which increases the probability of false rejects. Parallel text such as that shown on the disc 10 in FIG. 1 contributes to the majority of video noise problems which are reduced by the 45 degree rotation.

I form one of the walls of the housing 48 with a vent 74 to admit cooling air. An outlet port 76 in the top of the housing 48 may be connected to a fan or the like which draws exhaust air from inside the housing to eliminate heat buildup from the lamps in the camera.

I provide the housing 48 with a disc viewing mask 78 at a small distance above the disc within the camera station. As was the case with the diffuser, the mask 78 may be held in position by means of slots in three of the walls of the housing 48 to prevent attachment shadow reflections off the disc surface and into the camera. Mask 78 permits the camera to view only those regions which are vital to label inspection. Thus, the mask has a transparent area 80 extending radially inwardly from just inside the periphery of the disc to an inner opaque area 82 which covers the region 14 of the disc, as well as the hole 12. Mask 78 also prevents the camera from seeing background conveyor motion. Opaque area 82 masks out the disc ID ring, as well as any debris in the center of the disc carrier.

Preferably I provide the housing 48 with a hinged lid 84 which may be opened for access to the bulbs and the camera.

Figure 5:
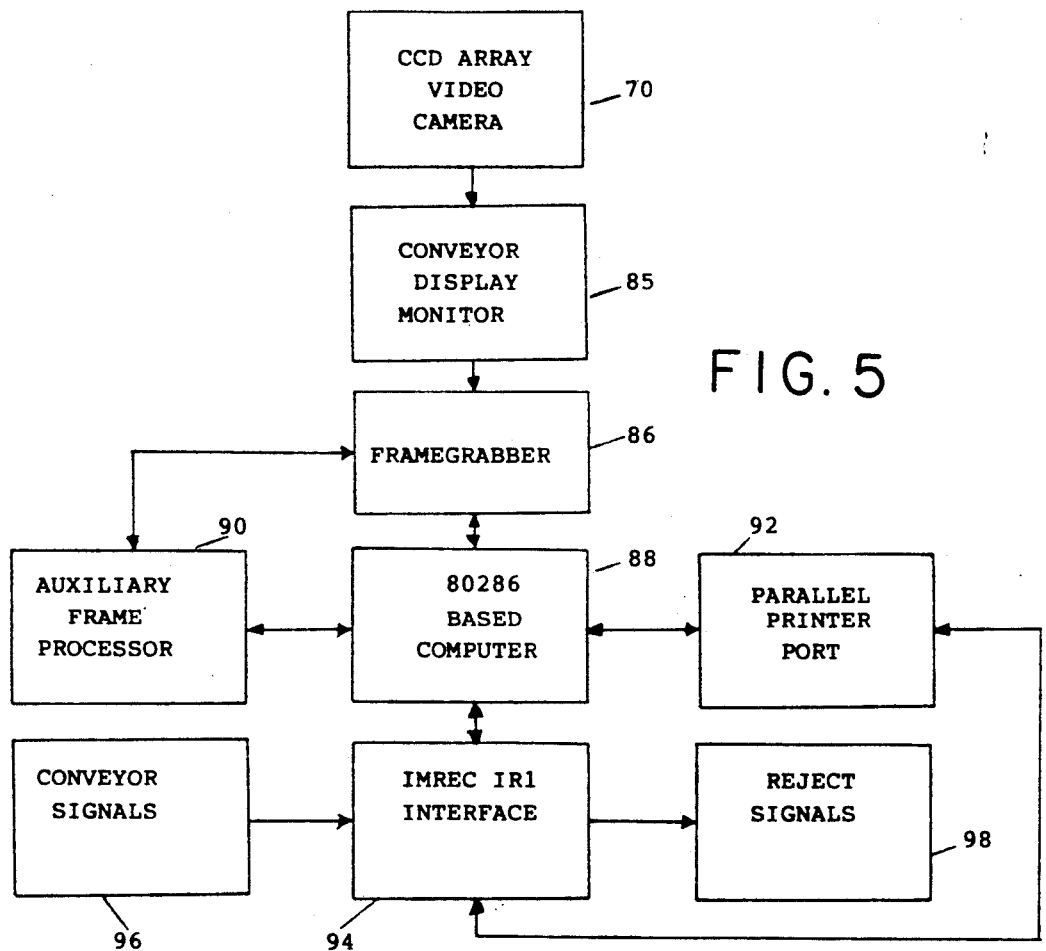
FIG. 5 is a block diagram illustrating a portion of the hardware of my print scanner.

Referring now to FIG. 5, the video output from the camera 70 is fed to a conveyer display monitor 85 and to a framegrabber 86 which may, for example, be a DT 2851 high resolution framegrabber produced by Data Translation Inc. of Marlboro, Mass. As is known in the art, the framegrabber digitizes the analog video signal and stores an image in one of two onboard frame-store memories. The framegrabber 86 communicates with an 80286 based computer 88. An auxiliary frame processor 90, which may for example be a Data Translation DT2858, communicates with the framegrabber 86 and the computer 88.

A parallel printer port 92 supplies data to and receives data from the computer 88. Conveyor signals indicated by a block 96 are transferred from 24 volts DC to 5 volts DC and sent to the parallel printer port 92 via an IMREC IR1 interface board. Reject signals produced by the computer 88 exit the parallel printer port 92 and are transferred from 5 volts DC to 24 volts DC via the interface 94 and fed to a block 98.

Figure 6:
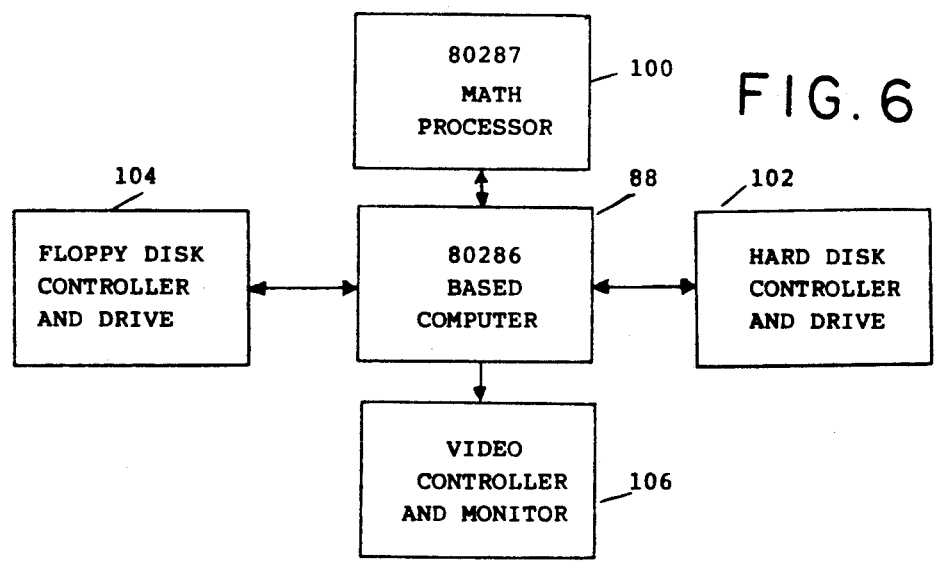
FIG. 6 is a block diagram illustrating another part of the hardware of my print scanner.

Referring now to FIG. 6, also associated with the computer 88 are an Intel 80287 math processor, a hard disc controller and drive 102, a floppy disc controller and drive 104, and a video controller and monitor 106.

Subtracting, averaging and histogram operations to be described hereinbelow occur within the hardware of the auxiliary frame processor 90, are all operations of which are triggered through software. The framegrabber 86 can store two video frames while one additional frame can be stored in a custom configured portion of the extended random access memory of computer 88. Figures of merit are determined using the processing capabilities of the 80286 CPU 88 and the 80287 processor 100.

Figure 7:
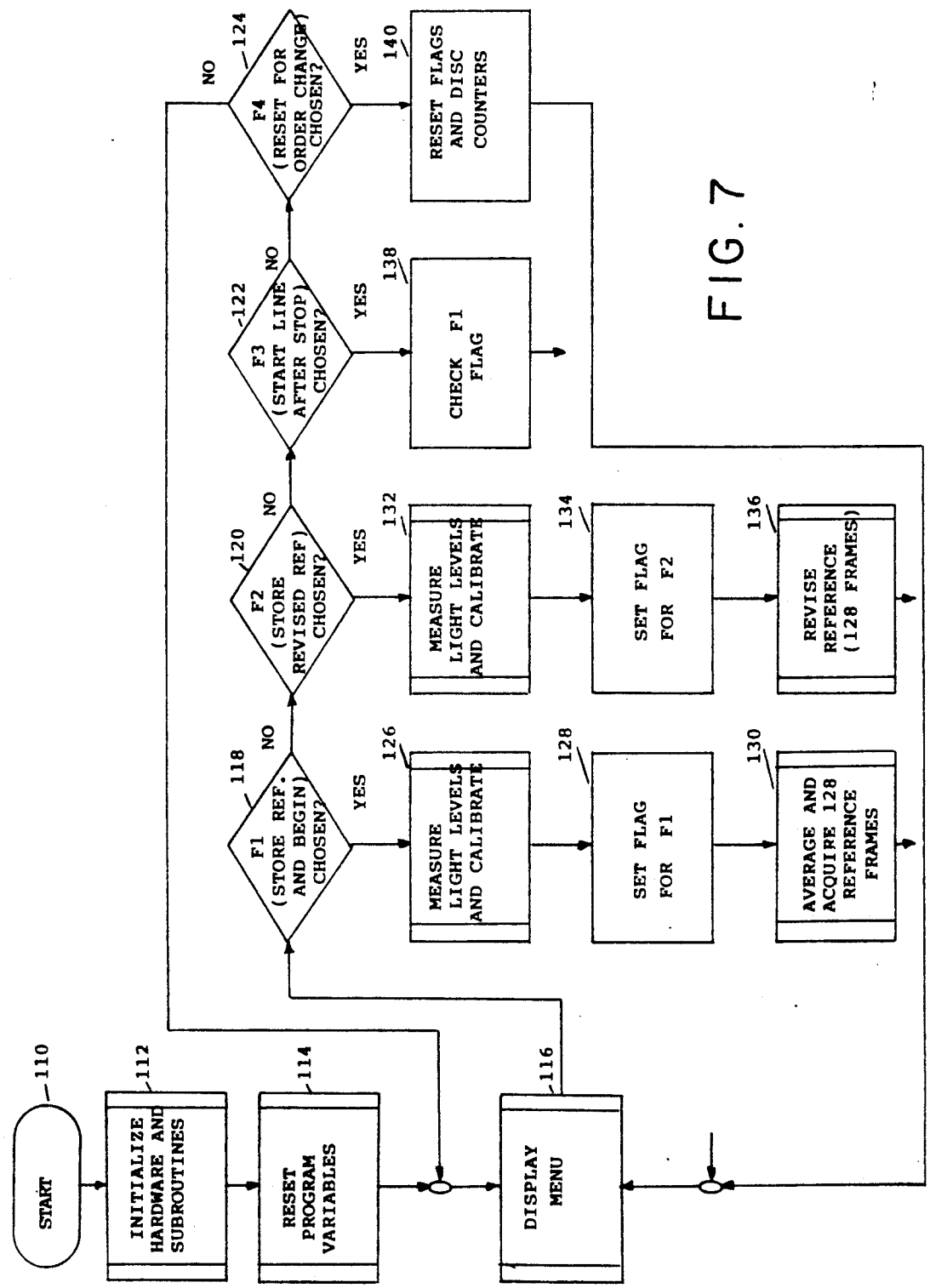
FIG. 7 is a flow diagram illustrating part of the operation of my print scanner.
Figure 8:
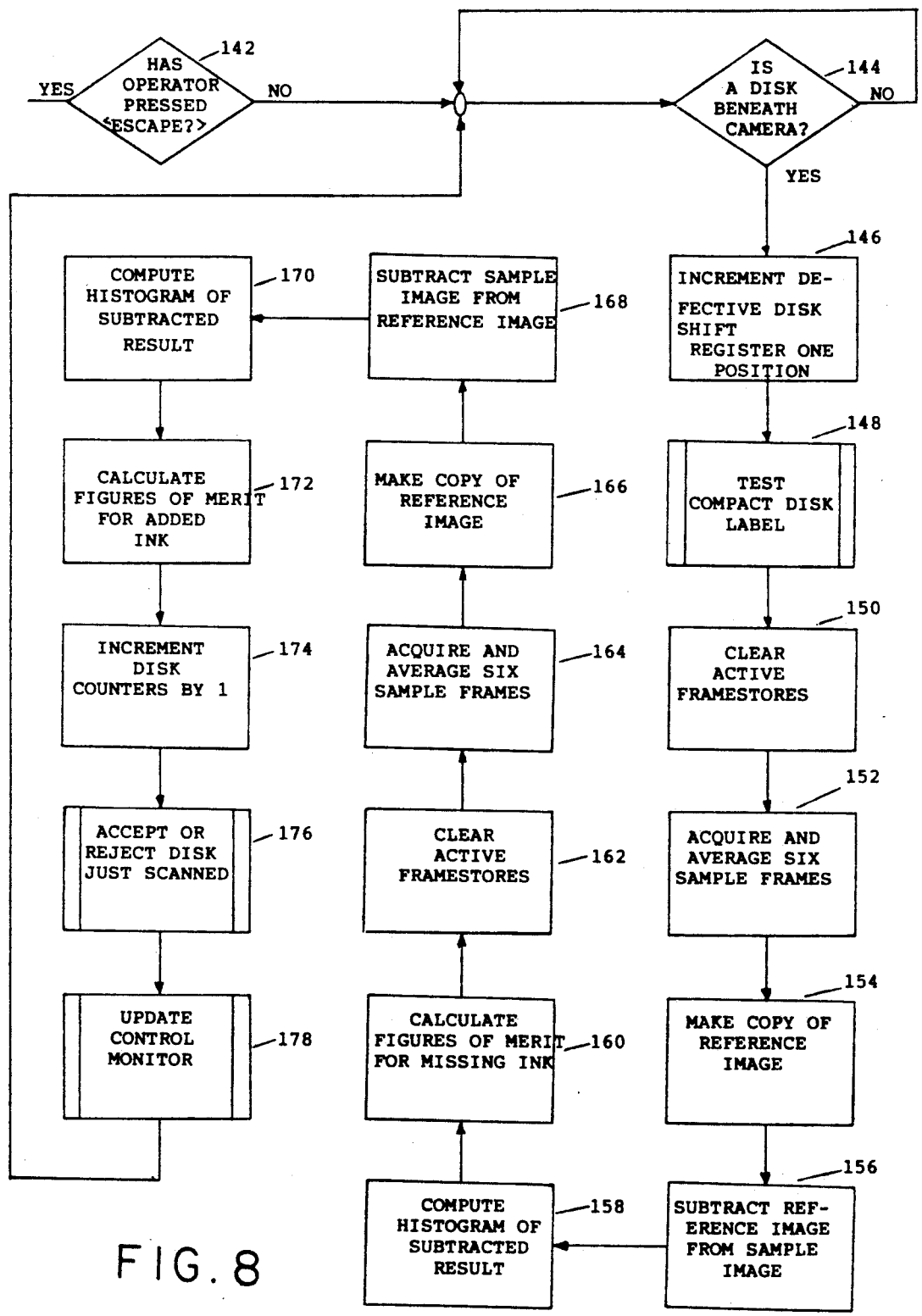
FIG. 8 is a flow diagram illustrating another portion the operation of my print scanner.
Figure 9:
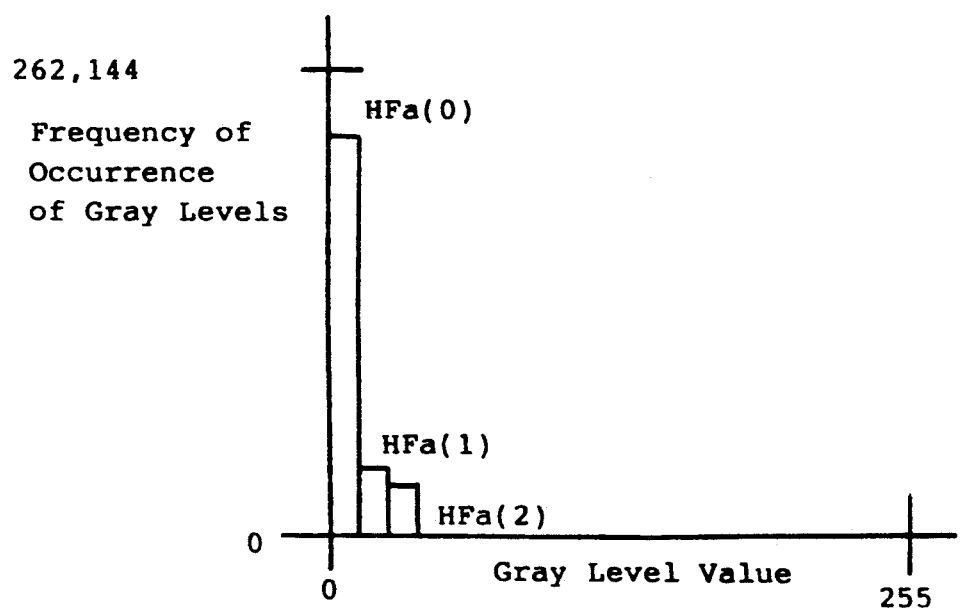
FIG. 9 is a histogram which I employ in calculating a figure of merit in my print scanner.

Referring now to FIGS. 7 and 8, the software which controls the print scanner will run in either one of two modes, the first of which is the "control mode" in which commands may be given to the scanner by the operator and the second of which is the "production mode" in which the scanner inspects discs throughout the production run. On startup, as indicated by the block 110, the program first initializes the hardware and subroutines as indicated by block 112, resets the program variables as indicated by block 114, and then displays the menu on the control monitor 106 as indicated by block 116. In the control mode the operator is instructed to select one of the following functions:

(F1) STORE A REFERENCE CD LABEL & BEGIN THE UPCOMING ORDER
(F2) STORE A REVISED REFERENCE CD LABEL (SAME SELECTION NUMBER)
(F3) CONTINUE PRINTER CONVEYOR ACTION AFTER A BREAK IN ACTION

(F4) RESET FOR ORDER CHANGE (NEW SELECTION NUMBER AND CLICHE)

The available functions are indicated by the blocks 118, 120, 122 and 124 in FIG. 7.

Assuming that function F1 has been selected, the scanner first measures the light levels and calibrates accordingly, as indicated by block 126. The F1 flag is set as indicated by block 128, and the scanner averages and acquires 128 reference frames, as indicated by block 130.

If the F2 function has been chosen, the light levels are measured and the scanner is calibrated again as indicated by block 132. The system sets the flag for F2 as indicated by block 134, and then revises the reference for 128 frames as indicated by block 136.

If function F3 corresponding to starting of a line after a stop is chosen, the system first checks the F1 flag as indicated by block 138 before proceeding.

If the F4 function corresponding to a reset or order change is chosen, the flags and disc counters first are reset as indicated by block 140 and the menu is again displayed. If no function is chosen, the menu continues to be displayed.

When the operator stops the printer with the chosen reference label beneath the camera, prior to taking the reference frame in the course of the lighting level calculation indicated by blocks 126 and 132, the reference label is subtracted from itself ten times.

If there were no video noise, the result of this subtraction would be zero for a difference of zero levels of gray. In reality, however, there is always some video noise which is a proportional function of the illumination lighting levels. Therefore, in the course of the operation performed, as indicated by blocks 126 and 132, prior to each storage of a reference frame the highest difference of gray levels due to noise during the ten subtraction sampling periods is stored and applied to all print scanner measurements which follow. This algorithm biases the zero difference by that maximum value due to noise. In the course of this operation two video frames are averaged for each video frame used in calculation in an effort to minimize noise. If this were not done, random noise would appear as small print defects.

When the light level noise bias has been computed, the reference picture is taken as indicated by block 130. In the course of this operation an accumulator averages 128 frames to keep video noise to an absolute minimum. With the reference frame in storage, scanning of the production run is begun by starting the printer conveyor back into motion.

Referring now to FIG. 8, in the course of scanning the production run the system first checks to see if the operator has pressed ESCAPE as indicated by block 142. If so, the menu is again displayed. If not, a check is made to see whether or not a disc is beneath the camera as indicated by block 144. If not, the system recycles until a disc is positioned beneath the camera. When that occurs as indicated by block 146, the defective disc shift register is incremented one position. Next, the compact disc label is tested as indicated by block 148. It will readily be appreciated that scans for print defects take place only when the conveyor is not in motion.

After the active frame stores have been cleared as indicated by block 150, six sample frames are required and averaged as indicated by block 152. Next, a copy of the reference image is made as indicated by block 154 and the reference image is subtracted from the sample image as indicated by block 156.

As is known in the art, the framegrabber 86 provides 51233 512×8-bit resolution for sharp spatial clarity and 256 gray levels. Thus, each stored image is made up of 262,144 pixels. Each subtraction operation is carried out on a pixel-by-pixel basis between the text or sample and reference frames.

As will be apparent from the description hereinbelow, the subtraction operation is performed in both directions, reference from test and test from reference, since the frame grabber converts all negative numbers that are the result of a subtraction to a value of zero. It will readily be appreciated that failure to subtract in both directions reduces the ability to detect either added ink or missing ink.

The result of the subtraction operation is placed in a section of RAM apart from where the two original frames resided to avoid the loss of the reference frame.

The defects calculation is based on statistics taken from the subtracted result. From the subtracted result I obtain a histogram which contains the frequency of occurrence of the possible 256 gray levels of the subtracted result. This is indicated by block 158. In addition, the sum of all gray levels of each of the 262,144 pixels in the subtracted result is calculated. With the zeroth element representing a frequency of occurrence of gray level zero of the histogram and the sum, I calculate a "figure of merit" for the test label which is equal to the sum divided by the zeroth element of the histogram. Under this formula a perfect label has a figure of merit of zero and a defective label has a figure of merit which is greater than zero and proportionate to the size and contrast of the defect. This step is indicated by the block 160.

Next the figures of merit for added ink are calculated. First, as indicated by the block 162 all of the active frame stores are cleared. Next, at 164, six sample frames again are acquired and averaged. A copy of the reference image is made at 166 and the subtraction operation of subtracting the reference from the image is performed at 168. With the subtraction information a histogram of the result of subtracting the sample image from the reference image is obtained at 170. Figures of merit for added ink are calculated at 172 and the disc counters are incremented by 1 at 174.

The figure of merit (FOM) is arrived at in the manner outlined with the following definitions:

Fr is the "reference video frame" which is the average of 128 video frames.

Fs is the "sample video frame" which is the average of 6 video frames.

Fa is the "analysis video frame" which is the result of a subtraction between Fr and Fs. For added ink defects Fa=Fr−Fs and for missing ink defects Fa=Fs−Fr.

P(RC) is the pixel gray level value at some row R and column C of the analysis video frame Fa.

H(Fa) is a 256 element histogram representing the frequencies of occurrence of gray levels 0 through 255.

FOM is the print quality "figure of merit".

From the foregoing discussion it will readily be apparent that in the analysis video frame there are 512 rows and 512 columns making up 262,144 pixels so that $0 \leq R < 511$ and $0 \leq C < 511$. The FOM is calculated as follows:

$$FOM = \frac{\sum_{R=0}^{511} \sum_{C=0}^{511} P(RC)}{H[Fa(0)]}$$

-continued
where $0 \leq P(RC) \leq 255$

For purposes of simplicity in the above diagram I have shown only the first three values of Fa.

If either of the two figures of merit for missing ink or for added ink exceeds its respective threshhold, a reject signal is sent through a software shift register so that it reaches the robot 44 at the same time the disc does. The signal is converted from 5 volts to 24 volts by interface 94. Upon receiving the defective print signal, robot 44 places the disc on a printing reject spindle (not shown). This procedure is indicated at block 176. The control monitor is updated at 178 and the program returns to 144 to determine whether or not a disc is beneath the camera.

The operations described above and illustrated in FIG. 8 are repeated as governed by the selection from the menu presented on the controller as described hereinabove. Thus, each of the outputs of blocks 130, 136 and 138 of FIG. 7 goes to the input to block 142 in FIG. 8.

It will be seen that I have accomplished the objects of my invention. I have provided a print scanner which overcomes defects of print scanners of the prior art. My print scanner is especially adapted for the inspection of compact disc labels. My print scanner detects both added and missing ink. It is more sensitive than are print scanners of the prior art.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A method of determining defects in a printed area including the steps of storing an image made up of a multiplicity of pixels of an acceptable area, acquiring an image comprising a multiplicity of pixels of a test area, subtracting one of said images pixel-by-pixel form the other image, computing a histogram of the result of said subtracting step and calculating a figure of merit for said test area on the basis of said histogram, said step of calculating said figure of merit comprising the step of dividing the gray level sum of all pixels in the result of the subtracting step by the zeroth element of the histogram.

2. A method as in claim 1 in which said subtracting step involves subtracting said test area image from said reference area image whereby said figure of merit is a first figure of merit for missing ink.

3. A method as in claim 2 including a second subtracting step of subtracting said reference area image pixel-by-pixel from said test area image, computing a second histogram of the result of the second subtracting step and calculating a figure of merit for unwanted ink in said test area from said second histogram.

4. A method as in claim 1 in which said figure of merit is calculated from the relationship:

$$FOM = \frac{\sum_{R=0}^{R=N1} \sum_{C=0}^{C=N1} P(RC)}{H[Fa(0)]}$$

where $0 \leq P(RC) \leq N2$,

H(Fa) is a histogram of $N2+1$ elements of the frequency of occurrence of gray levels 0 through N2, P(RC) is the pixel gray level value existing at some row R and column C of an analysis video frame Fa resulting from the subtraction of a reference video frame Fr from a sample video frame Fs for missing ink defects and a subtraction of Fs from Fr for added ink defects with Fa having $N1+1$ rows and columns, Fr is the average of a first predetermined number of video frames, and Fs is the average of a second number of video frames.

5. A method of examining printed labels of opaque compact discs having reflective surfaces, which discs have been moved through a printing station by a conveyor including the steps of providing a camera station at a predetermined position along said conveyor, exposing an acceptable reference label to a scanning video camera at said camera station to acquire an image made up of a plurality of pixels of said reference label, storing said reference label image, stationarily positioning a plurality of successive discs to be tested within said camera station, exposing a disc stationarily positioned in said camera station to light to acquire a test image made up of a multiplicity of pixels of the label of said disc and subtracting one of said images pixel-by-pixel from the other image to obtain a measure of the acceptability of a label being tested, said test image acquiring step comprising averaging a plurality of test label images.

6. A method as in claim 5 in which said step of acquiring said reference image comprises illuminating the reference disc at said camera station, subtracting the image of the reference label from itself a number of times, storing the highest difference of gray levels as a measure of illuminating light level and then acquiring said reference image.

7. A method as in claim 5 in which said reference label image acquiring step comprises averaging a multiplicity of reference label images.

8. A method of detecting defects in the printed label of a compact disc including the steps of positioning a disc having a reference label in operative relationship with a scanning camera, averaging a multiplicity of reference label frames from said camera and storing the resultant reference image, positioning a sample disc in operative relationship with said scanning camera, averaging a plurality of sample label frames to provide a sample image, subtracting said reference image pixel-by-pixel from said sample image, computing a histogram of the subtracted result, calculating a figure of merit for missing ink from said histogram averaging a plurality of sample label frames to provide another sample label image, subtracting said other sample image pixel-by-pixel from said reference image, computing a second histogram of the result of said second subtracting step calculating a figure of merit for added ink from said second histogram and accepting or rejecting said sample disc on the basis of said figures of merit.

9. A method as in claim 8 in which said figure of merit is calculated from the relationship:

$$FOM = \frac{\sum_{R=0}^{R=N1} \sum_{C=0}^{C=N1} P(RC)}{H[Fa(0)]}$$

where $0 \leq P(RC) \leq N2$,

H (Fa) is a histogram of N2+1 elements of the frequency of occurrence of gray levels 0 through N2, P(RC) is the pixel gray level value existing at some row R and column C of an analysis video frame Fa resulting from the subtraction of a reference video frame Fr from a sample video frame Fs for missing ink defects and a subtraction of Fs from Fr for added ink defects with Fa having n1+1 rows and columns, Fr is the average of a first predetermined number of video frames, and Fs is the average of a second number of video frames.

10. Apparatus for scanning a printed area to determine the existence of defects therein including in combination means for acquiring and storing an image made up of a multiplicity of pixels of an acceptable area, means for acquiring an image comprising of a multiplicity of pixels of a test area, means for subtracting one of said images pixel-by-pixel form the other image, means responsive to said subtracting means for computing a histogram of the subtracted results and means for calculating a figure of merit on the basis of said histogram, said calculating means comprising means for dividing the gray level sum of all pixels produced by said subtracting means by the zeroth element of the histogram.

11. Apparatus for detecting defects in the label area of a compact disc having a central opening and a non-printed area adjacent to said opening and supported by a carrier advanced intermittently along a predetermined path through a printing station including in combination, a substantially light-tight housing disposed at a point along said path beyond said printing station, an inlet port for admitting carriers into said housing, an outlet port through which carriers can emerge from said housing, means within said housing for illuminating the label area of a sample disc with diffuse light, a video camera within said housing for acquiring an image of an illuminated label area and means responsive to the output of said camera for producing an indication of a label defect, said illuminating means comprising a mask for blocking light from all of said disc except said label area.

12. Apparatus as in claim 11 in which said means responsive to said camera output comprises means for storing a reference image, means for acquiring a sample image, means for subtracting said sample image from said reference image as a measure of missing ink and means for subtracting said reference image from said sample image as a measure of added ink.

13. Apparatus as in claim 11 in which said illuminating means comprises a source of incandescent light and a light diffuser, said diffuser being positioned between said camera and said disc, said diffuser having an opening through which said camera can view said disc.

14. Apparatus as in claim 11 in which said illuminating means comprises a source of incandescent light and a diffuser, said diffuser being positioned between said camera and said disk and having an opening through which said camera can view said disc and a mask between said diffuser and said disc for blocking light from all except the label area of said disc.

15. Apparatus as in claim 14 including respective tunnels leading into said inlet and exit ports.

16. Apparatus as in claim 15 in which the inner walls of said tunnels are light absorbent.

17. Apparatus as in claim 11 in which the inner walls of said housing are light reflective.

18. Apparatus as in claim 11 in which said label area contains parallel text, said video camera being so positioned that its horizontal scan lines make an angle of 45 degrees with said parallel text.

* * * * *